United States Patent [19]

Shindo

[11] Patent Number: 5,340,060

[45] Date of Patent: Aug. 23, 1994

[54] RENDEZVOUS DOCKING OPTICAL SENSOR SYSTEM

[75] Inventor: Osamu Shindo, Kanagawa, Japan

[73] Assignee: Mitsubishi Denki Kabushiki Kaisha, Tokyo, Japan

[21] Appl. No.: 957,706

[22] Filed: Oct. 7, 1992

[30] Foreign Application Priority Data

Oct. 14, 1991 [JP] Japan .................. 3-264687

[51] Int. Cl.⁵ .................. B64G 1/64; G01C 1/06
[52] U.S. Cl. .................. 244/161; 250/206.2; 356/142; 340/958
[58] Field of Search .................. 244/158, 161; 250/208.6, 208.2, 203.6, 206.2, 234, 235, 236; 356/141, 142; 340/958

[56] References Cited

U.S. PATENT DOCUMENTS

| | | |
|---|---|---|
| 3,285,533 | 11/1966 | Jernigan, Jr. . |
| 4,314,761 | 2/1982 | Reymond et al. ............ 356/152 |
| 4,732,472 | 3/1988 | Konig et al. .................. 356/152 |
| 4,834,531 | 5/1989 | Ward ............................ 244/161 |
| 4,854,698 | 8/1989 | Schmidt ....................... 356/152 |
| 4,923,303 | 5/1990 | Lutz ............................. 356/375 |
| 4,928,009 | 5/1990 | Ikebe et al. .................. 356/152 |
| 4,964,722 | 10/1990 | Schumacher ............... 356/152 |
| 5,090,803 | 2/1992 | Ames et al. ................. 356/152 |

FOREIGN PATENT DOCUMENTS

| | | |
|---|---|---|
| 0122890 | 10/1984 | European Pat. Off. . |
| 3606399 | 9/1987 | Fed. Rep. of Germany . |
| 8816861 | 12/1988 | France . |

Primary Examiner—David A. Bucci
Assistant Examiner—Virna Lissi Ansley
Attorney, Agent, or Firm—Wolf, Greenfield & Sacks

[57] ABSTRACT

A rendezvous docking optical sensor system for calculating a coordinate position/attitude of chaser and target satellites in accordance with simple calculation equations without performing a complex process such as an image process so as to allow a high-speed calculation process and for realizing a high-reliability system which does not require a high-speed CPU. In the target satellite, a light source is provided which has a function whereby the entire visual field is scanned with a knife edge having edges orthogonal to each other, and in the chaser satellite, a plurality of detectors are provided which form a pattern. Further, there are provided a processing circuit, a computer and a control section which measure the light-transmitting and light-shielding timings of the knife edge so as to calculate and control the coordinate position/attitude of the satellites.

12 Claims, 8 Drawing Sheets

RENDEZVOUS DOCKING OPTICAL SENSOR SYSTEM

BACKGROUND OF THE INVENTION

1. Field of the Invention

The present invention relates to an optical sensor system which is for docking of two satellites existing on an orbit with one satellite (which will be referred hereinafter to as a chaser) measuring relative coordinate position/attitude of the other satellite (which will be referred hereinafter to as a target).

2. Description of the Prior Art

In a proposed conventional rendezvous docking optical sensor system, as illustrated in FIGS. 11(a), 11(b) and 12, a light source 3 and image pickup device 4 constituting an optical sensor 1 are mounted on a chaser 2 and a plurality of reflector markers 6 disposed to form a pattern are provided in a target 5. An operation of the conventional optical sensor 1 will be described hereinbelow. First, light is emitted from the chaser 2 toward the target 5. Here, since the chaser 2 does not exactly confirm the coordinate of the target 5, the light is emitted to advance within a diverged visual field including a direction in which it is considered as the target 5 exists. In response to the incidence of the light from the chaser 2, the reflector markers 6 of the target 5 reflect the light. Generally, in the reflector markers 6, there is provided a corner cube whereby the light is effectively reflected toward the light source. The image pickup device 4 of the chaser 2 receives, on its image-formation surface, an image having a deformed pattern configuration of the plurality of reflector markers 6. The deformed state of the pattern configuration of the reflector markers 6, incident on the image pickup device 4, with respect to a pattern obtained when being in opposed to the reflector markers 6 at a docking distance is calculated by a computer 7, thereby detecting the relative coordinate position and attitude. Secondly, a position control section 8 of the chaser 2 is operated so that the detected relative position/attitude becomes a coordinate position/attitude suitable for the docking. With the above-described processes being repeatedly performed, the final docking is effected.

The conventional rendezvous docking optical sensor 1 has the following problem. That is, because of emitting light from the chaser 2, the reflection from the body of the target 5 on which the reflector markers 6 are pasted is incident as the background light, particularly, in the case that a capton which is a heat control material is pasted on the base thereof, since the regular reflected light returns to the chaser 2 due to irregularities on the surface of the capton, a high-grade image processing is required in order to differentiate it from the reflection due to the reflector markers 6. The high-grade image processing requires a CPU of the computer 7 which can perform the processing at a high speed. However, of the actual high-speed processing CPUs, there is no CPU which has a high reliability for use in the space. Thus, it is required to perform the high-grade image processing with a low-speed CPU, thereby causing the processing time to become long. Accordingly, the conventional system which requires a long processing time has a low safety because the satellite detects the relative coordinate position/attitude when in a moving state.

SUMMARY OF THE INVENTION

The present invention has been developed in order to eliminate such a problem and it is an object of this invention to provide a rendezvous docking optical sensor system which is capable of calculating the mutual coordinate positions and attitudes with a simple calculating equation without using a complicated processing such as an image processing to thereby perform the calculation at a high speed and which does not require a high-speed CPU to have a high reliability.

In a rendezvous docking optical sensor system according to this invention, a light source is provided in a target and a plurality of detectors are provided in a chaser, and the light source has a device to scan the entire visual field by a knife edge and the knife edge has edges perpendicularly intersecting each other, the edges being arranged to alternately scan the visual field. Further, the plurality of detectors are disposed in the body of the chaser to form a pattern and converts the illumination and cut-off due to the knife edge of the target into ON/OFF signals. The timings of these ON/OFF signals are measured so that the mutual satellite coordinates and positions are calculated in accordance with a predetermined equation using a computer.

That is, in the rendezvous docking optical sensor system according to this invention, the scanning device provided in the light source of the target sets a virtual coordinate in the entire visual field. Since the scanning is effected at a constant speed, the angle of visibility is evenly divided by the scanning angle. Thus, the scanning angle at the time that one detector of the chaser detects the intersection of the knife edge gives the angle of visibility in that scanning direction. If scanning with the knife edge in the orthogonal scanning directions to similarly obtain the angle of visibility, when viewed from the coordinate of the target, it is possible to detect the direction in which the detector of the chaser exists. If the plurality of detectors is disposed in the body of the chaser to has a pattern, the coordinate of each of the detectors with respect to the target can be determined and therefore it is possible to obtain the mutual coordinate position/attitude on the basis of the deformation of the original pattern.

The above and other objects, features, and advantages of the Invention will become more apparent from the following description when taken in conjunction with the accompanying drawings.

DESCRIPTION OF THE PREFERRED EMBODIMENT

Figure 1:
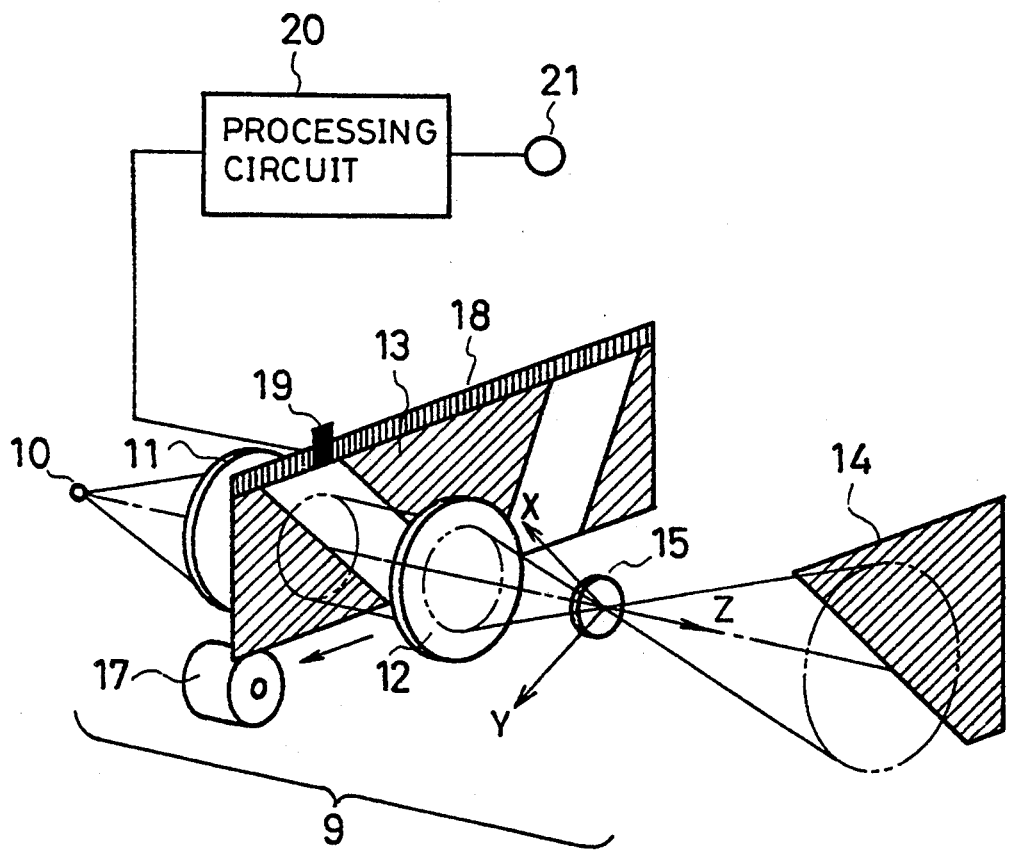
FIG. 1 is an illustration of an arrangement of a scanning optical system according to a first embodiment of the present invention.
Figure 2:
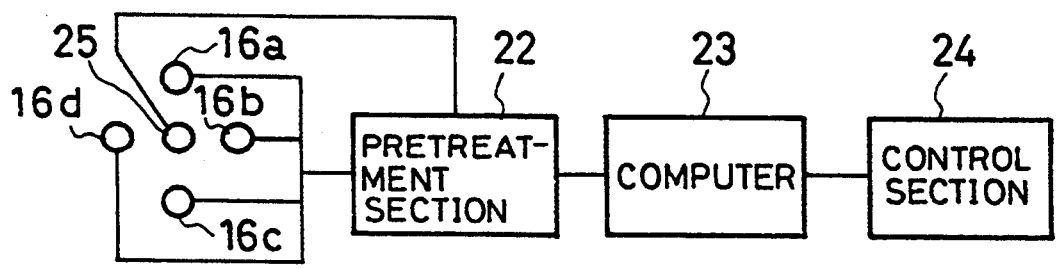
FIG. 2 is a block diagram showing units to be mounted on a chaser in the first embodiment of this invention.
Figure 3A:
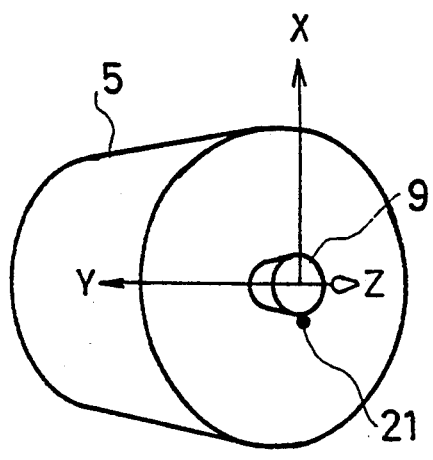
FIGS. 3(a) and 3(b) are illustrations of a used state of the first embodiment of this invention.
Figure 3B:
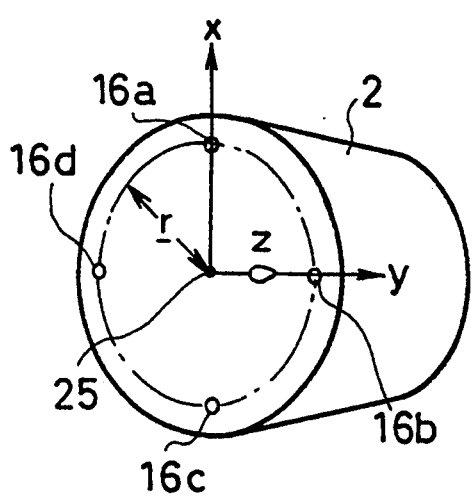
Figure 4:
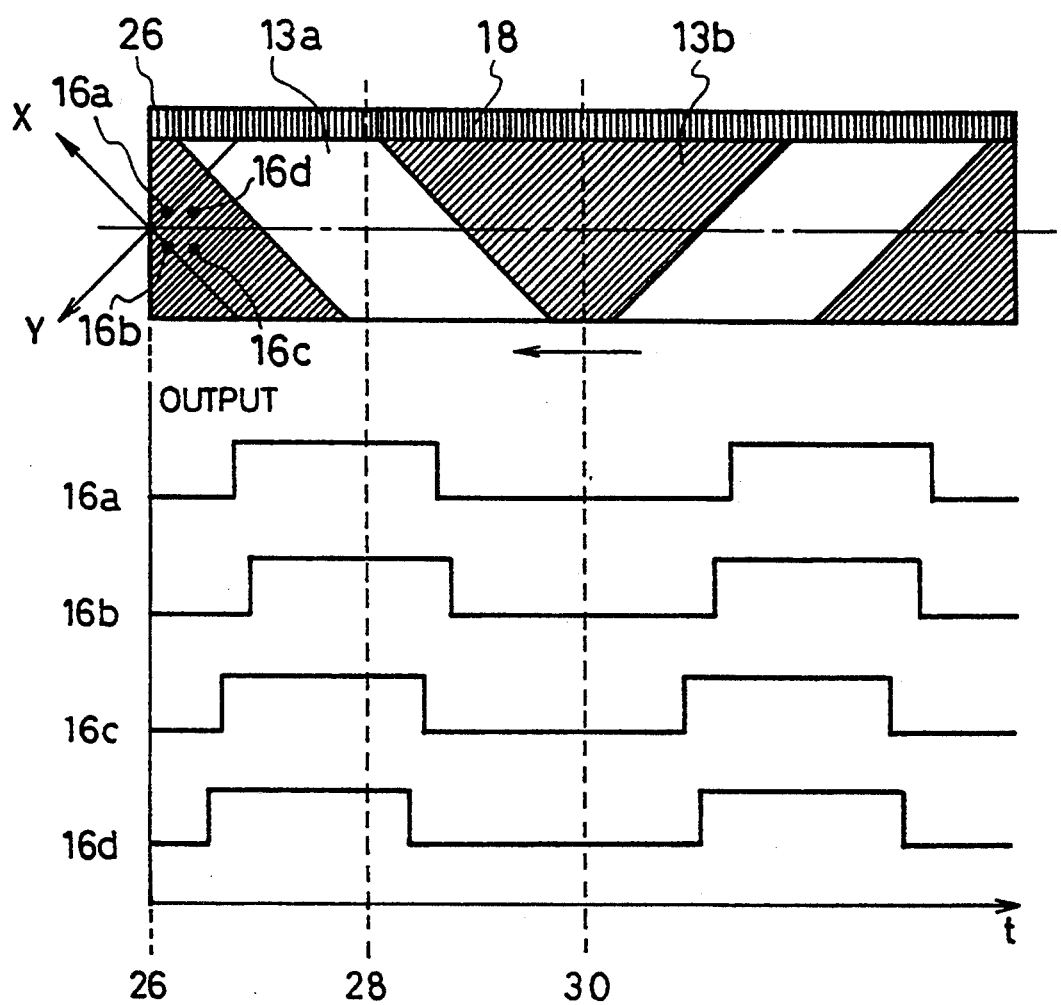
FIG. 4 is an illustration for describing the principle of an operation of a knife edge to be used in the first embodiment of this invention.

FIG. 1 is an illustration of an optical arrangement of a scanning optical system 9 according to a first embodiment of the present invention, FIG. 2 is a block diagram showing apparatus to be mounted on a chaser in this embodiment, and FIG. 3 shows a used state of this embodiment, FIG. 3(a) showing a mounted position of the scanning optical system 9 to be mounted on a target and FIG. 3(b) showing a portion of the apparatus to be mounted on the chaser. As illustrated in FIG. 3(b), 4 detectors 16a, 16b, 16c and 16d are disposed at an angular interval of 90° on a circumference having a radius of r. Further, as shown in FIG. 1, the scanning optical system 9 is arranged such that a filament of a halogen lamp 10 is disposed on an object-side focal point of a collimator lens 11 so as to obtain a substantially parallel ray. This parallel ray is applied to a knife edge 13 which is placed on the object-side focal point of a projection lens 12. The projection lens 12 forms the filament image on the image-side focal point of the projection lens 12, and then projects the knife edge image 14 into the space. On the image-side focal point of the projection lens 12 there is placed a condenser lens 15. The optical constant is determined so that the knife edge image 14 is formed when taking the closest distance with respect to the detectors 16a, 16b, 16c and 16d of the chaser 2 illustrated in FIG. 3(b). The knife edge 13 is driven by a motor 17 so as to be moved at a constant speed. The movement of the knife edge 13 is detected as a pulse signal by means of a linear encoder 18 and a photointerrupter 19 which are formed at the circumferential portion of the knife edge 13, and the detected pulse signal is supplied to a processing circuit 20 and delivered through a light-emitting diode 21 to the chaser 2. The knife edge 13 is arranged so as to alternately cut (shield) a light ray perpendicularly incident thereon.

As shown in FIG. 2, on the chaser 2 there are provided a pretreatment section 22 and a computer 23 for processing signals from the 4 detectors 16a, 16b, 16c and 16d. The pretreatment section 22 and the computer 23 are coupled to a control section 24 for controlling the attitude of the chaser 2 in accordance with the calculated coordinate and attitude value. Further, a detector 25 is provided which is for receiving the pulse signal from the light-emitting diode 21, the output of the detector 25 being inputted to the pretreatment section 22.

The coordinate axes of the target 5 are arranged such that, as illustrated in FIGS. 1 and 3(a), the optical axis of the optical system is taken to be the Z axis whose positive direction is the light-advancing direction, and the directions parallel to the scanning direction of the knife edge 13 are taken as the X and Y axes to construct the right-hand system. The coordinate origin of the target 5 is set to the position of the filament image of the halogen lamp 10 formed through the collimator lens 11 and the projection lens 12. The coordinate axes of the chaser 2 are arranged such that, as illustrated in FIG. 3(b), the z axis is substantially equal to the Z axis of the target 5, and the x and y axes respectively correspond to directions parallel to lines connecting the paired detectors which are disposed in opposed relation to each other with respect to the center of the arrangement circle, on which the detectors 16a, 16b, 16c and 16d are disposed, under the condition that the arrangement circle is parallel to the X-Y plane, the axes being determined so as to form the right-hand system. The coordinate origin of the chaser 2 is equal to the center of the arrangement circle. The completion of the docking means the state that the X, Y, Z axes of the target 5 become parallel to the x, y, z axes of the chaser 2 and the distance between the coordinate origins of the target 5 and the chaser 2 becomes a given value, for example, the closest distance.

The operation of the target 5 will be described hereinbelow with reference to FIG. 4. The target 5 has a function to transmit the knife edge image. The knife edge 13 is arranged to comprises a completely light-transmitting area 13a, a completely light-cutting portions 13b and a linear encoder area 18. First, a reset point 26 of the linear encoder area 18 is detected so as to obtain a start pulse. This pulse signal is detected by the photointerrupter as shown in FIG. 1 and then supplied to the chaser 2 through the light-emitting diode 21 as shown in FIG. 1, Thereafter, the shielding in the X-axis directions is started and again effected over the entire visual field and then released, thereby completing one cycle. This shielding and releasing are accurately effected along the time axis.

Figure 5:
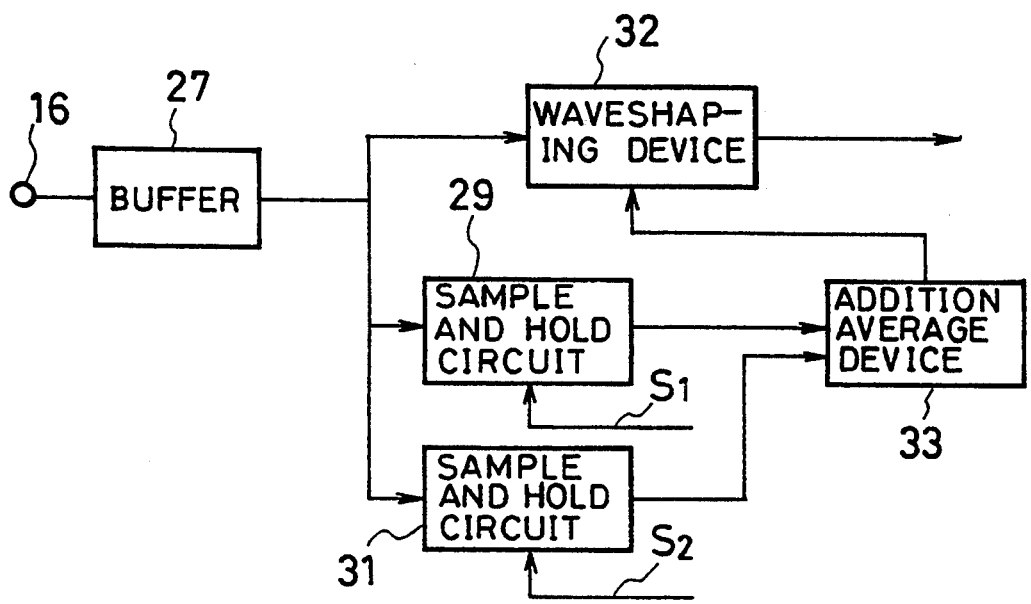
FIG. 5 is a block diagram showing a waveform shaping circuit to be used in the first embodiment of this invention.

Secondly, a description will be made with reference to FIG. 4 in terms of the signal detection of the chaser 2. The chaser 2 receives the knife edge light from the target 5 through its detectors 16a, 16b, 16c and 16d to as to output ON/OFF signals. For describing that situation, in FIG. 4, the knife edge 13 and the detectors 16a, 16b, 16c and 16d are overlapped. It is easily seen that the rise/fall points of the output signals of the respective detectors are different from each other in accordance with the situation. The moving amount of the knife edge 13 is measured on the basis of the pulse signal supplied from the light-emitting diode 21 shown in FIG. 1, i.e., the output pulse signal of the linear encoder 18. In the pretreatment section 22 in FIG. 2, the output pulse signal of the linear encoder 18 is used as a reset pulse in counting the clock of the chaser 2 and used for more finely resolving the width of one pulse due to the linear encoder 18. In response to start of the capture, the knife edge 13 performs one cycle of shielding. At this time, the pretreatment section 22 illustrated in FIG. 2 generates a sample pulse S1 with respect to the output signal of a buffer 27 at the light-transmitting time 28 over the entire visual field in the X- or Y-axis directions, and the output signal of the knife edge 13 at that time is held in a sample and hold circuit 29 shown in FIG. 5. Similarly, the pretreatment section 22 generates a sample pulse S2 at the light-shielding time 30 over the entire visual field in the X- or Y-axis directions, and the output signal of the knife edge 13 at that time is held in a sample and hold circuit 31 shown in FIG. 5. As illustrated in FIG.

5, the output signal at the light-transmitting time and the output signal at the light-shielding time are inputted to an adding and averaging circuit 33 and the output signals of the detectors 16a, 16b, 16c and 16d are waveshaped in a waveform shaping circuit 32 with the output level of the circuit 33 being used as a threshold level.

Let it be assumed that the rise or fall of the output signal of a predetermined detector waveshaped occurs between the pulse count value T and the pulse count value T+1 in the linear encoder 18 and the clock pulse is generated so that one pulse interval of the linear encoder 18 is evenly divided into N and the rise or fall thereof occurs at the time of the clock pulse number n. When the advancing time interval of one pulse due to the linear encoder 18 is taken as $\Delta t$, the time t from the start pulse in the rise or fall is given in accordance with the following equation.

$$t = \{T + n/N\} \cdot \Delta t \tag{1}$$

Figure 6:
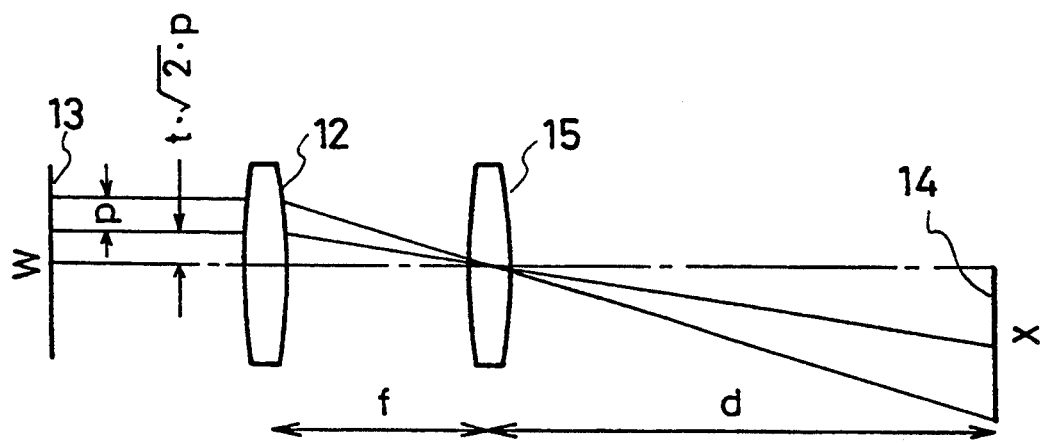
FIG. 6 is an illustration for describing the principle of calculating a coordinate value on the basis of the number of clock counts.

In FIG. 6, when the width of one pulse due to the linear encoder 18 is taken to be p, the entire screen width of the knife edge 13 is taken as W, the focal length of the projecting lens 12 is taken to be f and the distance of the predetermined detector from the condenser lens 15 is taken as d, the one-axis (for example, X-axis) coordinate of the detector on the X-Y coordinate plane is given in accordance with the following equation.

$$X = t \cdot \sqrt{2} \cdot p \cdot d/f - W/2 \tag{2}$$

The X-Y coordinates of all the detectors 16a, 16b, 16c and 16d are obtained through the above-described procedure. Accordingly, the following discussion is performed on the basis of the coordinate values.

Figure 7:
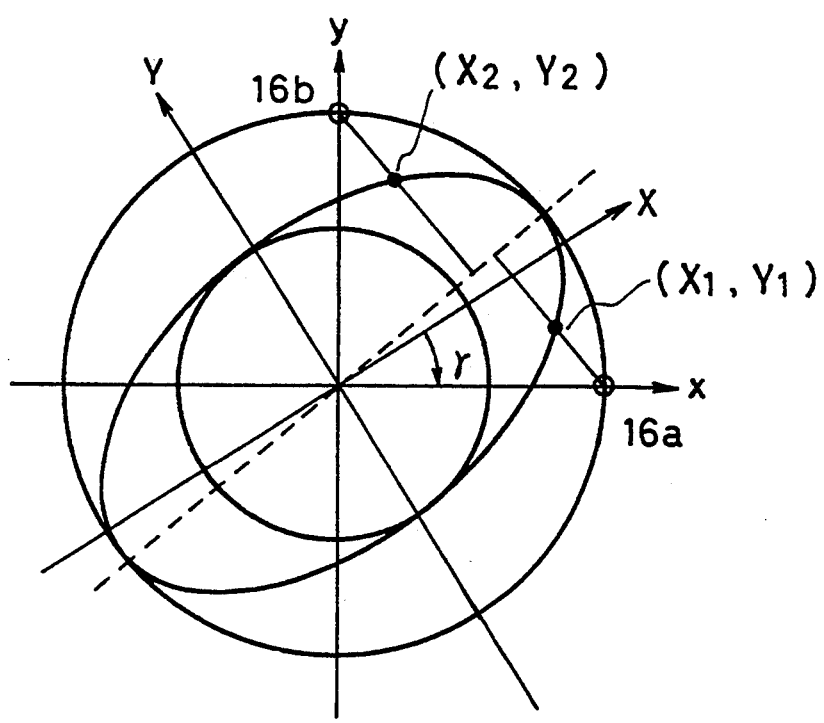
FIG. 7 is an illustration for briefly describing the coordinate transformation between an XYZ coordinate system and an xyz coordinate system.

A description will be made hereinbelow in terms of a calculation process to be effected in the computer 23 in FIG. 2. The computer 23 of the chaser 2 calculates the inclination of the xyz coordinate system viewed from the XYZ coordinate system of the target 5 and further calculates the origin position. The X-Y plane and the x-y plane arc always determined to be parallel to each other, while the coordinate axes are not generally parallel to each other. In this case, the XYZ coordinate of each of the four detectors 16a, 16b, 16c and 16d is arranged to be the projective point to the x-y coordinate plane so as to be obtained by the coordinate revolution as illustrated in FIG. 7. Here, in FIG. 7, only the detectors 16a and 16d are illustrated. The raw X-Y coordinates of the respective detectors are indicated in accordance with the following equation (3) and the values indicated in the following equation (4) are defined.

$16a{:}(X_1, Y_1)$ $16b{:}(X_2, Y_2)$ $16c{:}(X_3, Y_3)$ $16d{:}(X_4, Y_4) \tag{3}$ $X_{00} = (X_1 + X_3)/2$ $Y_{00} = (Y_2 + Y_4)/2 \tag{4}$ This gives the X-Y coordinate of the center or the arrangement circle of the detectors. For convenience, values indicated by the following equation (5) are defined under k=1, 2.

$X_{k0} = (X_k - X_{k+2})/2$ $Y_{k0} = (Y_k - Y_{k+2})/2 \tag{5}$

Figure 8:
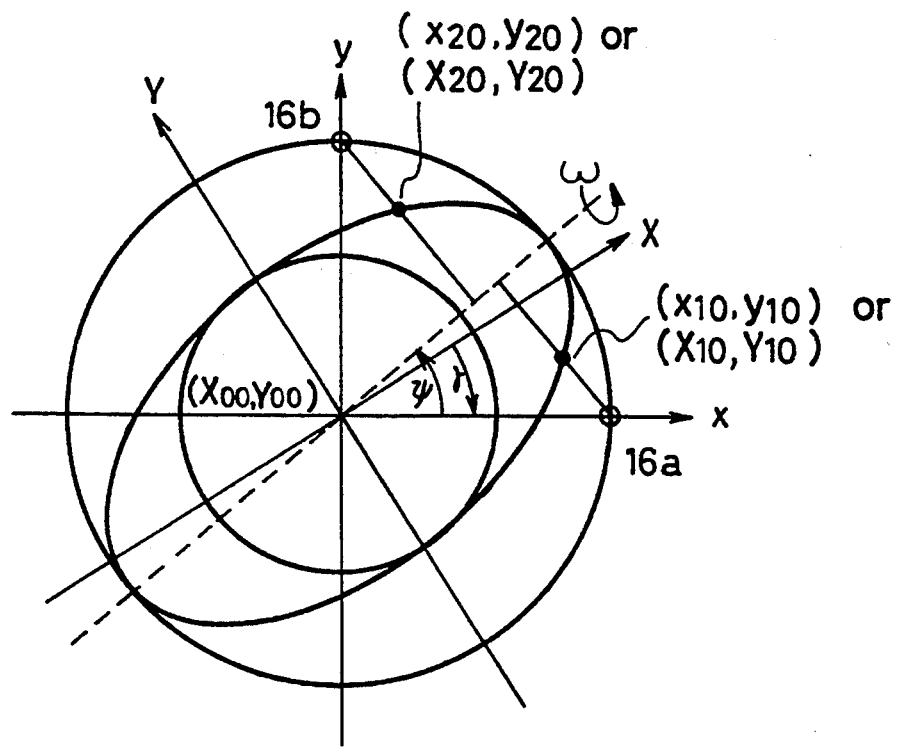
FIG. 8 is an illustration for describing the principle of the transformation between the XYZ coordinate system and the xyz coordinate system.

An equation for determining the rotational angle $\gamma$ of the xyz axes with respect to Z axis is introduced. Generally, since the detector arrangement circle of the chaser 2 has an inclination with respect to the x-y plane, a state is taken as illustrated in FIG. 8. Here, it is considered that the origin of the XYZ coordinate system is coincident with the origin of the xyz coordinate system and the position $(X_{00}, Y_{00})$ defined by the equation (4) is the origin. In addition, if the coordinate in the xyz coordinate system which corresponds to the coordinate $(X_{k0}, Y_{k0})$ in the XYZ coordinate system is $(x_{k0}, y_{k0})$, it is proven that the following equation (6) is satisfied.

$$y_{10} = x_{20} \tag{6}$$

From this equation and the following coordinate revolution equation (7), the rotational angle $\gamma$ can be obtained in accordance with the following equation (8).

$x_{k0} = X_{k0} \cos \gamma - Y_{k0} \sin \gamma$ $Y_{k0} = X_{k0} \sin \gamma + Y_{k0} \cos \gamma \tag{7}$ $\tan \gamma = (X_{20} - Y_{10})/(X_{10} + Y_{20}) \tag{8}$ An equation for determining the inclination of the detector arrangement circle with respect to the x-y plane is introduced. The turning line of the inclination is indicated by a dotted line in FIG. 8, and it is proven that the angle $\phi$ of turning line with respect to the x axis is indicated by the following equation (9)

$$\tan 2\phi = -(x_{20} + Y_{10})/(Y_{20} - x_{10}) \tag{9}$$

Thus, from the equations (7) and (8), the angle $\phi$ can be obtained in accordance with the following equation (10). The angle $\phi$ is also determined irrespective of $Z_{00}$.

$$\tan 2\phi = -\frac{2(X_{10}X_{20} + Y_{10}Y_{20})}{X_{20}^2 - Y_{10}^2 - X_{10}^2 + Y_{20}^2} \tag{10}$$

When the lengths of the long and short axes of an ellipse are taken to be a, b and the principal value of the angle $\phi$ obtained by the equation (10) is taken as $\phi_{p \cdot v}$, since the relation shown by the following equation (11) can be proven, the inclination angle $\omega$ of the chaser 2 can be obtained in accordance with the following equation (12).

$a = x_{10} + y_{10} \tan \phi_{p \cdot v}$ $b = -x_{20} \tan \phi_{p \cdot v} + y_{20} \tag{11}$ $\cos \omega = a/b \tag{12}$ The following equation (3) can be obtained from the equations (7) and (8). The angle $\omega$ is determined irrespective of $Z_{00}$.

$\cos \omega = A/B \tag{13}$ where $$A = X_{20}^2 - X_{20}Y_{10} + X_{10}Y_{20} + Y_{20}^2 - (X_{10}X_{20} + Y_{10}Y_{20}) \tan \phi_{p \cdot v}$$

$$B = X_{10}^2 - X_{20}Y_{10} + X_{10}Y_{20} + Y_{10}^2 + (X_{10}X_{20} + Y_{10}Y_{20}) \tan \phi_{p \cdot v}$$

An equation for determining the Z coordinate $Z_{00}$ of the chaser origin is introduced. In the equation (11) and (12), a is equal to the radius r of the detector arrangement circle. When the subscript of the detector 16a is k=1, the subscript of the detector 16b is k=2, the subscript of the detector 16c is k=3 and the subscript of the detector 16d is k=4, for example, the X coordinate of the detector 16 is given by the following equation (14), and therefore, the following equation (16) can be obtained on the basis of the following equation (15) and the equation (5).

$$X_k = t_{X \cdot k} \cdot \sqrt{2} \cdot p \cdot d/f - W/2 \quad (14)$$

$$Z_{00} = d$$

$$\Delta t_X = t_{X \cdot k} - t_{X \cdot k+2} \quad (15)$$

$$X_{k0} = (t_{X \cdot k} - t_{X \cdot k+2}) \cdot \sqrt{2} \cdot p \cdot d/(2f) \quad (16)$$

$$= Z_{00} \cdot (\sqrt{2} \cdot \Delta t_X \cdot p)/(2f)$$

$$Y_{k0} = Z_{00} \cdot (\sqrt{2} \cdot \Delta t_Y \cdot p)/(2f)$$

When substituting the equation (16) into the equation (7) the following equations (17) and (18) can be obtained.

$$C_{xk} = \sqrt{2} \cdot p \cdot (\Delta t_X \cdot \cos \gamma - \Delta t_Y \cdot \sin \gamma)/f \quad (17)$$

$$C_{yk} = \sqrt{2} \cdot p \cdot (\Delta t_X \cdot \sin \gamma + \Delta t_Y \cdot \cos \gamma)/f$$

$$x_{k0} = Z_{00} \cdot C_{xk}/2 \quad (18)$$

$$y_{k0} = Z_{00} \cdot C_{yk}/2$$

Where $C_{xk} + C_{yk}$ are intermediate values.

By substituting the equation (18) into the equation (11), $Z_{00}$ can be determined by the following equation (19).

$$Z_{00} = 2r/(C_{x1} + C_{y1} \tan \phi_{p \cdot v}) \quad (19)$$

From the equation (4), the X-Y coordinate ($X_{00}$, $Y_{00}$) of the chaser origin is given in accordance with the following equation (20).

$$X_{00} = (X_1 + X_3)/2$$

$$Y_{00} = (Y_2 + Y_4)/2 \quad (20)$$

The control section 24 is controlled on the basis of the coordinate position/attitude in the XYZ coordinate system of the target 5 calculated by the computer 23 in the chaser 2 so as to perform the correction to the coordinate position/attitude necessary for the docking. Until the final docking is completed, the above-described process is effected.

Figure 9:
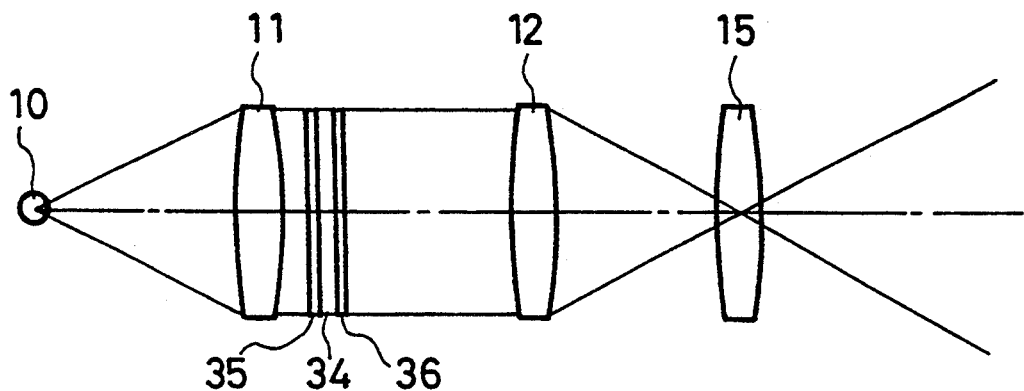
FIG. 9 is an illustration of a second embodiment of this invention.

FIG. 9 shows another embodiment (second embodiment) of the scanning optical apparatus 9. The knife edge 13 is arranged such that, in place of a liquid crystal plate 34, polarizing plates 35 and 36 are disposed before and after the liquid crystal plate 34. As well as described above, the knife edge operation of the liquid crystal plate 34 is constructed with a screen pattern so as to be scanned from two directions. However, the operation is not continuously effected so as to deteriorate the accuracy, while simplifying the peripheral structure.

Figure 10:
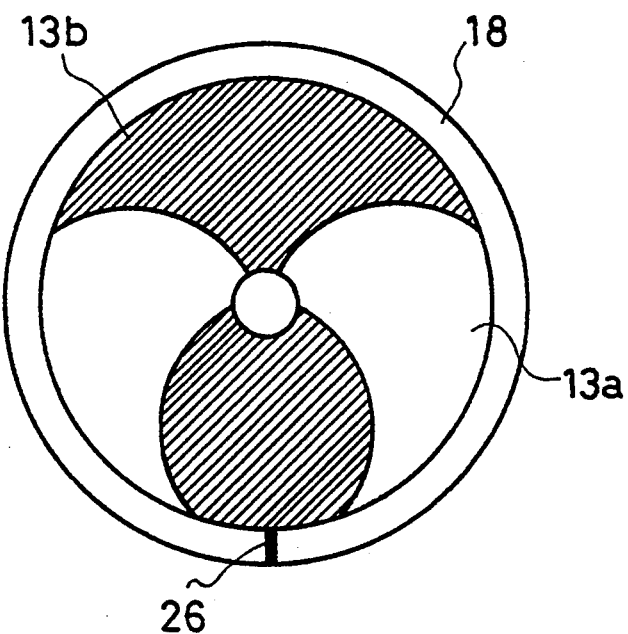
FIG. 10 is an illustration of a third embodiment of this invention.
Figures 11A, 11B:
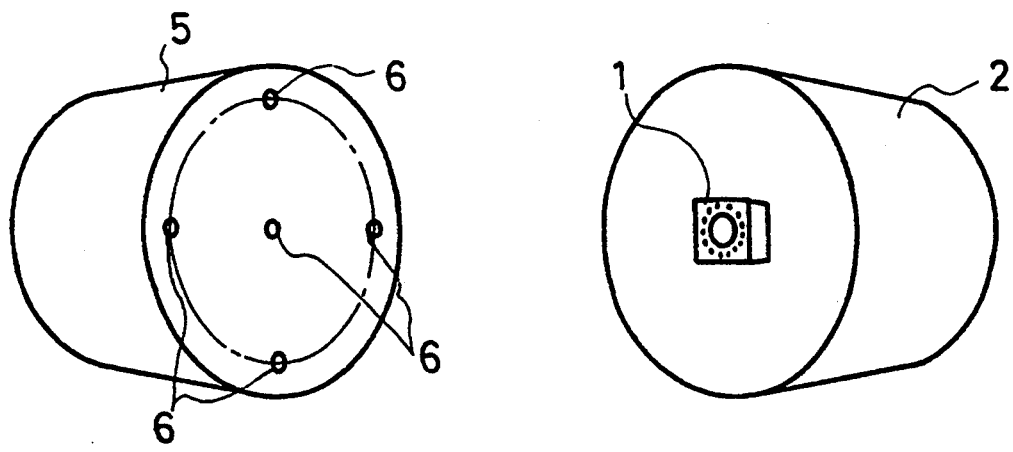
FIGS. 11(a) and 11(b) are illustrations of a used state of a conventional rendezvous docking optical sensor system.
Figure 12:
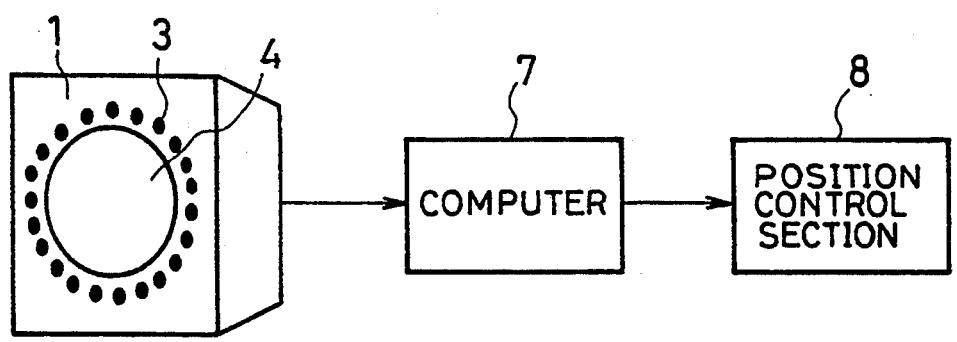
FIG. 12 is a block diagram showing an arrangement of the conventional rendezvous docking optical sensor system.

FIG. 10 shows a wheel knife edge for achieving the similar object by means of the rotational scanning in place of the linear scanning. This knife edge can be considered as being constructed such that the base of the knife edge shown in FIG. 4 is contracted to one point. If using this wheel, the scanning can be effected with an extremely simple operation.

Since this invention has a structure as described above, the following effect can be obtained. That is, since the light source is provided at the target, the reflection light of the background light due to the reflection of the light source light does not occur, and hence a differentiating process due to a high-grade image processing is not required. In addition, since the relative coordinate position/attitude is obtained by basically calculating the arithmetic equations using elementary functions without performing the process in accordance with the image processing, a high-speed CPU such as a 32-bit CPU necessary for the image processing is not required, and it is sufficiently possible to perform the processing with an 8-bit CPU and it is possible to extremely improve the safety in the docking.

What is claimed is:

1. A rendezvous docking optical sensor system comprising:

a light source optical system provided in one of two satellites existing on an orbit in a space, said light source optical system having a function to perform a scanning operation at a constant speed to project a scanned image in said space;

a transmitter provided in the one satellite for transmitting the scanning speed of said light source optical system to the other satellite;

four detectors provided in the other satellite so as to be disposed at an interval of 90° on a circumference having a radius;

a receiver for receiving said scanning speed;

a pretreatment section provided in one other satellite for waveshaping output signals of said detectors into gate pulses and counting clock pulses;

a computer provided in the other satellite for performing a calculation process on the basis of count data of said pretreatment section so as to calculate a relative coordinate position and attitude; and a control section provided in the other satellite for correcting a coordinate position and attitude of said satellites on the basis of a calculation result of said computer to adjust the relative attitude of said satellites during docking between said satellites.

2. A rendezvous docking optical sensor system as claimed in claim 1, wherein said pretreatment section includes a waveshaping device for performing a sample-and-hold of signal levels of said detector obtained when light is transmitted and shielded by a complete light-transmitting area and a complete light-shielding area of a knife edge so as to perform a waveshaping operation with an addition average of both the signal levels being used as a threshold level.

3. A rendezvous docking optical sensor system as claimed in claim 1, wherein, when raw coordinates of said detectors are taken as (X1, Y1), (X2, Y2), (X3, Y3)

and (X4, Y4), said computer calculates a coordinate amount ($X_{k0}$, $Y_{k0}$) in accordance with the following equations:

$$X_{k0}=(X_k-X_{k+2})/2$$

$$Y_{k0}=(Y_k-Y_{k+2})/2$$

where k=1, 2, said computer calculates a rotational angle $\gamma$ about an X axis of a chaser coordinate system relative to a target coordinate system in accordance with the following equation:

$$\tan \gamma = (X_{20}-Y_{10})/(X_{10}+Y_{20}),$$

said computer calculates an inclination of a detector arrangement circle with respect to an x-y plane of said chaser coordinate system in accordance with the following equations:

$$\tan 2\phi = -\frac{2(X_{10}X_{20}+Y_{10}Y_{20})}{X_{20}^2-Y_{10}^2-X_{10}^2+Y_{20}^2}$$

where $\phi$ represents an angle made with respect to the X axis $$\cos \omega = A/B$$

where $$A = X_{20}^2 - X_{20}Y_{10} + X_{10}Y_{20} + Y_{20}^2 - (X_{10}X_{20}+Y_{10}Y_{20})\tan \phi_{p \cdot v}$$

$$B = X_{102} - X_{20}Y_{10} + X_{10}Y_{20} + Y_{10}^2 - (X_{10}X_{20}+Y_{10}Y_{20})\tan \phi_{p \cdot v}$$

where $\phi_{p \cdot v}$ represents a principle value of $\phi$ and $\omega$ is the inclination angle of the chaser, said computer calculates a Z coordinate of a chaser origin in said target coordinate system in accordance with the following equation:

$$Z_{00}=2r/(C_{x1}+C_{y1}\tan \phi_{p \cdot v})$$

where r represents a radius, and where intermediate values $C_{X1}$ and $C_{Y1}$ are obtained from the following, $$C_{xk} = \sqrt{2} \cdot p \cdot (\Delta t_x \cdot \cos\gamma - \Delta t_y \cdot \sin\gamma)/f$$

$$C_{yk} = \sqrt{2} \cdot p \cdot (\Delta t_x \cdot \sin\gamma + \Delta t_y \cdot \cos\gamma)/f$$

and calculates a chaser origin X-Y coordinate in said target coordinate system in accordance with the following equation:

$$X_{00}+(X_1+X_3)/2$$

$$Y_{00}+(Y_2+Y_4)/2.$$

4. A rendezvous docking optical sensor system as claimed in claim 2, wherein said knife edge is constructed with a liquid crystal plate.

5. A rendezvous docking optical sensor system as claimed in claim 2, wherein said knife edge comprises a liquid crystal plate and polarizing plates disposed before and after said liquid crystal.

6. A rendezvous docking optical sensor system as claimed in claim 2, wherein said knife edge has a wheel knife edge structure which can achieve an object by a rotational scanning.

7. A rendezvous docking optical sensor system comprising:

a light source optical system provided in one of two satellites existing on an orbit in a space, said light source optical system having a function to perform a scanning operation to project a scanned image in said space;

a transmitter provided in the one satellite for transmitting the scanning speed of said light source optical system to the other satellite;

four detectors provided in the other satellite on a circumference having a radius;

a receiver for receiving said scanning speed;

a pretreatment section provided in one other satellite for waveshaping output signals of said detectors;

a computer provided in the other satellite for performing a calculation process on the basis of count data of said pretreatment section so as to calculate a relative coordinate position and attitude; and a control section provided in the other satellite for correcting a coordinate position and attitude of said satellites on the basis of a calculation result of said computer to adjust the relative attitude of said satellites during docking between said satellites.

8. A rendezvous docking optical sensor system as claimed in claim 7, wherein said pretreatment section includes a wavershaping device for performing a sample-and-hold of signal levels of said detector obtained when light is transmitted and shielded by a complete light-transmitting area and a complete light-shielding area of a knife edge so as to perform a waveshaping operation with an addition average of both the signal levels being used as a threshold level.

9. A rendezvous docking optical sensor system as claimed in claim 8, wherein, when raw coordinates of said detectors are taken as (X1, Y1), (X2, Y2), (X3, Y3) and (X4, Y4), said computer calculates a coordinate amount ($X_{k0}$, $Y_{k0}$) in accordance with the following equations:

$$X_{k0}=(X_k-X_{k+2})/2$$

$$Y_{k0}=(Y_k-Y_{k+2})/2$$

where k=1, 2, said computer calculates a rotational angle $\gamma$ about an X axis of a chaser coordinate system relative to a target coordinate system in accordance with the following equation:

$$\tan \gamma = (X_{20}-Y_{10})/(X_{10}+Y_{20}),$$

said computer calculates an inclination of a detector arrangement circle with respect to an x-y plane of said chaser coordinate system in accordance with the following equations:

$$\tan 2\phi = -\frac{2(X_{10}X_{20}+Y_{10}Y_{20})}{X_{20}^2-Y_{10}^2-X_{10}^2+Y_{20}^2}$$

where $\phi$ represents an angle made with respect to the X axis $$\cos \omega = A/B$$

where $$A = X_{20}^2 - X_{20}Y_{10} + X_{10}Y_{20} + Y_{20}^2 - (X_{10}X_{20} + Y_{10}Y_{20})\tan\phi_{p\text{-}v}$$

$$B = X_{102} - X_{20}Y_{10} + X_{10}Y_{20} + Y_{10}^2 - (X_{10}X_{20} + Y_{10}Y_{20})\tan\phi_{p\text{-}v}$$

where $\phi_{p\text{-}v}$ represents a principle value of $\phi$ and $\omega$ is the inclination angle of the chaser, said computer calculates a Z coordinate of a chaser origin in said target coordinate system in accordance with the following equation:

$$Z_{00} = 2r/(C_{x1} + C_{y1}\tan\phi_{p\text{-}v})$$

where r represents a radius, and where immediate values $C_{X1}$ and $C_{Y1}$ are obtained from the following, $$C_{xk} = \sqrt{2}\cdot p \cdot (\Delta t_x \cdot \cos\gamma - \Delta t_y \cdot \sin\gamma)/f$$

$$C_{yk} = \sqrt{2}\cdot p \cdot (\Delta t_x \cdot \sin\gamma + \Delta t_y \cdot \cos\gamma)/f$$

and calculates a chaser origin X-Y coordinate in said target coordinate system in accordance with the following equation:

$$X_{00} + (X_1 + X_3)/2$$

$$Y_{00} + (Y_2 + Y_4)/2.$$

10. A rendezvous docking optical sensor system as claimed in claim 8, wherein said knife edge is constructed with a liquid crystal plate.

11. A rendezvous docking optical sensor system as claimed in claim 8, wherein said knife edge comprises a liquid crystal plate and polarizing plates disposed before and after said liquid crystal.

12. A rendezvous docking optical sensor system as claimed in claim 8, wherein said knife edge has a wheel knife edge structure which can achieve an object by a rotational scanning.

* * * * *